United States Patent

Chen et al.

[11] Patent Number: 5,965,644
[45] Date of Patent: Oct. 12, 1999

[54] HALOGEN CONTAINING FIRE RETARDANT AND FIRE RETARDED RESIN COMPOSITIONS CONTAINING SAID FIRE RETARDANT

[75] Inventors: Toshihiko Chen; Tetsunori Sato; Yoshiyuki Morikawa, all of Tokyo, Japan

[73] Assignee: Thoto Kasei Co., Ltd., Tokyo, Japan

[21] Appl. No.: 08/939,164

[22] Filed: Sep. 29, 1997

[30] Foreign Application Priority Data

Sep. 30, 1996 [JP] Japan ................................. 8-258438

[51] Int. Cl.$^6$ ...................................... C08K 5/15
[52] U.S. Cl. ............................. 524/109; 252/609
[58] Field of Search ................... 524/109, 411, 524/412, 373; 252/609

[56] References Cited

U.S. PATENT DOCUMENTS

| | | | |
|---|---|---|---|
| 4,504,608 | 3/1985 | Kishida et al. | 524/412 |
| 5,250,590 | 10/1993 | Nakai et al. | 524/109 |
| 5,350,802 | 9/1994 | Muskopf et al. | 524/109 |
| 5,376,718 | 12/1994 | Yada | 524/109 |
| 5,395,874 | 3/1995 | Mishima et al. | 524/109 |
| 5,837,799 | 11/1998 | Chen et al. | |

*Primary Examiner*—Veronica P. Hoke
*Attorney, Agent, or Firm*—Sherman and Shalloway

[57] ABSTRACT

A halogen containing fire retardant represented by chemical formula (1) wherein the end groups X and Y are composed by A or B represented by chemical formula (2); and the said fire retardant is a mixture of the composition containing 1 to 40% of X=Y=A, 30 to 70% of X=A and Y=B, smaller than 70% of X=Y=B and, degree of polymerization n is n≧0 wherein the content of n=0 is smaller than 60% to the total amount.

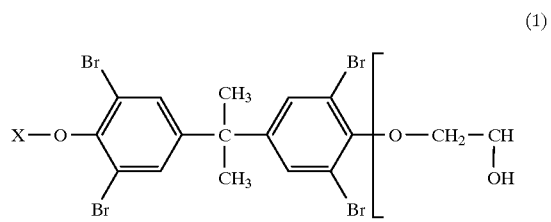
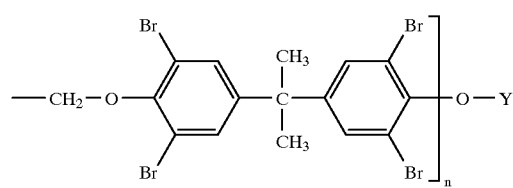

(1)

wherein A and B are represented by following chemical formulae, and R of chemical formula B is an alkyl group of carbon number 1 to 8 alone, or 1 to 79% of alkyl group of carbon number 1 to 8 and 79 to 1% of tribromophenyl group, and total amount of R is smaller than 80%.

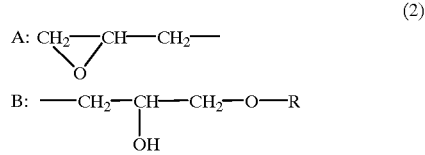

(2)

4 Claims, No Drawings

HALOGEN CONTAINING FIRE RETARDANT AND FIRE RETARDED RESIN COMPOSITIONS CONTAINING SAID FIRE RETARDANT

BACKGROUND OF THE INVENTION

This invention relates to a fire retarded thermoplastic resin composition, and provides with the improved fire retarded resin composition and the halogen containing fire retardant for a thermoplastic resin which have a good fire retardation and is superior in the features of light resistance, heat resistance, resistance to hydrolysis, fluidity and also have a non-stickness feature to the metallic part such as screw or cylinder of an injection molding machine or an extruder and a mold. Further, in detail, this invention provides with the fire retarded thermoplastic resin composition and the fire retardant for thermoplastic resin which can be applied to the fields in which a feature of fire retardation is required such as a part of an office automation tool or a household electric appliances, a housing and an automotive parts.

DESCRIPTION OF THE PRIOR ART

A polystyrene resins such as high impact polystyrene (HIPS) or ABS have a good mechanical property and also have a good electric insulation and a molding ability. Further, since a polyester resin such as PET or PBT, a polyamide resin, an engineering plastic such as polycarbonate, a polyolefin resin such as polyethylene or polypropylene or a polymer alloy by voluntary combinations of mentioned thermoplastic resin are improved to have the properties of a heat resistance and a dimensional stability, are widely applied to a housing or a connector of an office automation tool or a household electric appliances or an automotive parts.

However, since all of these above mentioned resin are easy to burn, they are strongly requested to have a fire retarded property. Especially in the field of an office automation tool and a household electric appliances, they are exposed to a fluorescence lamp and sun shine, and have a tendency of yellowing by aging. So the feature of light resistance is very important. Further, since a polyester resin, polycarbonate resin and polymer alloy containing these resin have also a problem of easily hydrolysis, the improvement of this property is simultaneously necessary at the improvement of a property of fire retardation.

Up to the present, for the improvement of fire retardation of a thermoplastic resin, various kinds of halogenated organic compound have been proposed. As the typical well-known examples, tetrabromobisphenol A (TBA), polybromodiphenylether (PBDPE), brominated polycarbonate, brominated polystyrene, brominated epoxy resin and a brominated epoxy resin whose epoxy groups are completely blocked by tribromophenol (TBP) can be mentioned. Especially, former two compounds are preferably put to practical use because of their lower prices.

However, TBA has a defect that remarkably deteriorates the properties of a bleeding out, a heat resistance and a light resistance when mixed with polystyrene resin, further DBDPE or the epoxy resin blocked completely with TBP has a defect to deteriorate the light resistance. And in a case of brominated epoxy resin, since it has a strong sticking nature to the metallic part of an extruder or an injection molding machine at the melt extruding process or at the melt molding process, stuck polymer is exposed to high temperature for long time and discolored. These deteriorated fragments are mixed into a compound or a molded product as contaminations. Further, when a brominated epoxy resin is mixed together with a polyester resin, a polycarbonate resin or a polyamide resin, epoxy groups of epoxy resin react with a carboxyl group or a hydroxyl group of polyester, a phenolic hydroxyl group of polycarbonate or an active hydrogen of polyamide and have a tendency of gelation.

OBJECT OF THE INVENTION

The inventors of this invention have conduced intensive studies about a new fire retardant which can replace the above mentioned fire retardants. That is, the inventors of this invention have found that the improved fire retardant for thermoplastic resin which has an excellent fire retardation together with the properties of a light resistance, a heat resistance, a excellent fluidity and also have a non-stickness to the metallic part such as screw or cylinder of an injection molding machine or an extruder and a mold can be obtained by blocking a part of epoxy groups of a halogenated bisphenolepoxy resin with mono-alcohol of carbon number 1 to 8 and/or TBP, and accomplished the present invention. The object of this invention is to provide with a new fire retardant for thermoplastic resin and a fire retarded thermoplastic resin composition containing said fire retardant.

BRIEF SUMMARY OF THE INVENTION

The important point of the present invention is a halogen containing fire retardant represented by chemical formula (1),

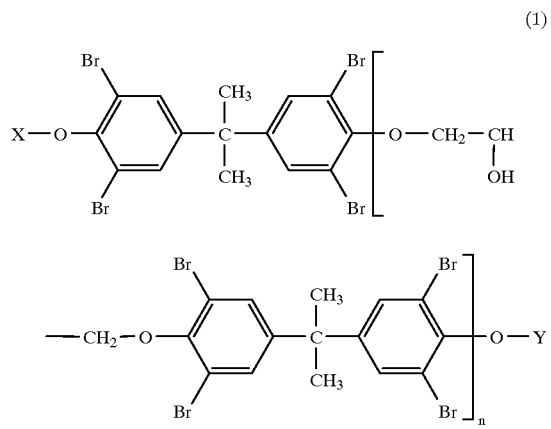

wherein the end groups X and Y are composed by A or B represented by chemical formula (2); and the said fire retardant comprises a mixture of the composition containing 1 to 40% of X=Y=A, the composition containing 30 to 70% of X=A and Y=B, the composition containing smaller than 70% of X=Y=B and, degree of polymerization n is $n \geq 0$ wherein the content of n=0 is smaller than 60% to the total amount.

Wherein A and B are represented by following chemical formulae, and R of chemical formula B is an alkyl group of carbon number 1 to 8 alone or 1 to 79% of alkyl group of carbon number 1 to 8 and 79 to 1% of tribromophenyl group and total amount is smaller than 80%.

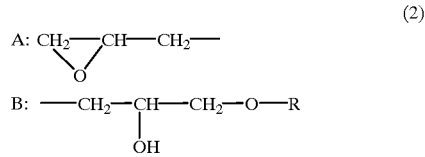

DETAILED DESCRIPTION OF THE INVENTION

The halogen containing fire-retardant of this invention will appear more fully from the following description.

The halogen containing fire-retardant used in this invention is a composition of halogenated bisphenol epoxy resin whose epoxy groups are partially blocked with monoalcohol of carbon number 1 to 8 and/or with TBP, and the content of degree of polymerization n=0 is smaller than 60% to the total amount and con ten t of n≧1 is bigger than 40% to the total amount. Desirably, contents of n=0 is smaller than 50% to the total amount and that of n≧1 is bigger than 50%. When the contents of n=0 exceeds 60% of total amount and that of n≧1 is smaller than 40%, the softening temperature of the fire retardant is low and easier to blocking, and is not easy to handle. And also said fire retardant has a defect that the heat distortion temperature of fire retarded thermoplastic resin composition which uses the fire retardant falls down.

X and Y which are the end groups of the halogen containing fire retardant represented by above mentioned chemical formula (1) and (2) are restricted as, the contents of composition of X=Y=A is 1 to 40%, the contents of composition of X=A and Y=B is 30 to 70% and the contents of composition of X=Y=B is smaller than 70% (the sum of three compositions is 100%). Desirably, the contents of composition of X=Y=A is 3 to 30%, the contents of composition of X=A and Y=B is 35 to 65% and the contents of composition of X=Y=B is smaller than 70%. The end group A of general formula (1) is effective to maintain the feature of light resistance and resistance to hydrolysis which are the advantage of brominated epoxy oligomer, and B is introduced for the purpose to improve the defect of a stickness to metal and a gelation. Except the contents of composition of X=Y=A is 1 to 40%, and the contents of composition of X=A and Y=B is 30 to 70%, the effect for light resistance and the improvement of resistance to hydrolysis of polyester, polycarbonate and the polymer alloy of them can not be expected. And for the improvement of stickness to metal and for the prevention against gelation, it is necessary to contain smaller than 70% of composition of X=Y=B and 30 to 70% of X=A and Y=B.

Epoxy equivalent of the fire retardant of this invention is in the region of about 1000 to 5000 g/eq. desirably 1200 to 4000 g/eq. and more desirably 1300 to 3000 g/eq. When epoxy equivalent is high, polystyrene resin containing this fire retardant has a problem in a view point of the light resistance, and polyester resin and polycarbonate resin containing this fire retardant has a problem in a view point of anti hydrolysis. Further, when epoxy equivalent is low, the fire retardation of fire retarded thermoplastic resin is not sufficient and also have a problem referring to the handling property.

The important point of the present invention is a halogen containing fire retardant represented by chemical formula (1), (1)

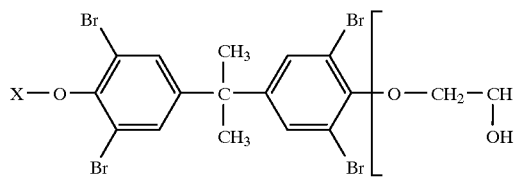

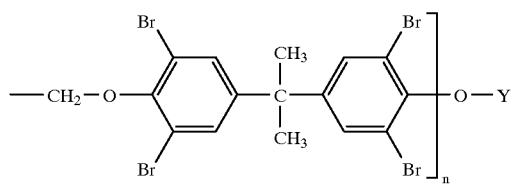

wherein the end groups X and Y are composed by A or B represented by chemical formula (2); and the said fire retardant comprises a mixture of the composition containing 1 to 40% of X=Y=A, the composition containing 30 to 70% of X=A and Y=B, the composition containing smaller than 80% of X=Y=B and, degree of polymerization n is n≧0 wherein the content of n=0 is smaller than 60% to the total amount.

Wherein A and B are represented by following chemical formulae, and R of chemical formula B is an alkyl group of carbon number 1 to 8 alone or 1 to 79% of alkyl group of carbon number 1 to 8 and 79 to 1% of tribromophenyl group and total amount is smaller than 80%.

(2)

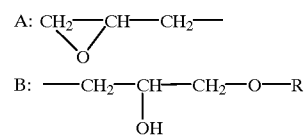

As the concrete examples of halogenated bisphenolepoxy resin of this invention following compounds can be mentioned.
diglycidylether of tetrachlorobisphenol A,
diglycidylether of tetrabromobisphenol A,
diglycidylether of tetrabromobisphenol F,
diglycidylether of tetrabromobisphenol S,
diglycidylether of tetrabromohydroxyquinone,
or glycidyleter of bromophenolnovolac.

As the concrete examples of mono-alcohol of carbon number 1 to 8 which block the epoxy group of halogenated bisphenolepoxy resin, methanol, ethanol, propanol, buthanol, amyl alcohol, hexanol, heptanol and the isomer of these compounds can be mentioned.

As the method for preparation of the compound of haloganated bisphenol epoxy resin whose epoxy group is partially blocked by monoalcohol of carbon number 1 to 8 or by monoalcohol of carbon number 1 to 8 and TBP, a method to react blocking agent of epoxy group which can react with short chain monoalcohol and/or TBP with halogenated epoxy resin and with halogenated bisphenol for necessity in the presence of catalyst at 80 to 220° C.; or a method to heat and react haloganated epoxy resin whose end group is a phenolic hydroxylic group with glycidylether of said short chain monoalcohol and/or glycidylether of TBP in the presence of catalyst; or a method to react mono-alcohol and TBP with epihalohydrine, then after halogenated bisphenol, solvent and catalyst are added, washed by water, neutralized and desolvented. As the catalyst, hydroxide of alkali metal, tertiary amine, imidazole, quaternary ammonium salt, phosphine, phosphonium salt, boron fluoride and tin chloride can be mentioned. In the present invention, the preparing method of fire-retardant is not intended to be limited in the above mentioned methods.

The fire retarded thermoplastic resin compounds of this invention will appear more fully from the following description.

As the substantial examples of the thermoplastic resin used in this invention is a polystyrene resins such as high impact polystyrene (HIPS), ABS resin, AES resin, MBS resin and AS resin, polyphthalicpolyester resin such as poly-buthyreneterephthalate, polyamide resin, polyphenylene-ether resin, polyolefin resin such as polyethylene and polypropylene and a polymer alloy by voluntary combinations of above mentioned thermoplastic resins can be mentioned.

When the fire retardant of this invention is used by mixing with a thermoplastic resin, it is desirable to use 1 to 35 parts of fire retardant to 100 parts of thermoplastic resin by weight. More desirable region is from 5 to 25 parts. Further, the different kinds of fire retardant can be used together with the fire retardant of this invention, in the limitation that they do not disturb the effect of the fire retardant of this invention. Furthermore, as the subsidized fire retardant the use of 1 to 15 weight parts of antimony oxide, sodium antimonide, antimonate phosphate and molybdenum oxide together with the fire retardant of this invention are useful to improve the effect of fire retardation. Still further, a slipping agent, an ultra violet ray absorber, an antioxidant, a pigment, a dyestuff, a releasing agent, a filler and other additives can be voluntarily added.

EXAMPLES AND COMPARATIVE EXAMPLES

The present invention will now be described in more detail with the Examples and Comparative Examples, but is not intended to be limited to these Examples. The indications of part and % in the Examples are given on the basis of weight. And in the present invention, the following method of test were used.

(1) epoxy equivalent: JIS K-7234
(2) softening point: JIS K-7236
(3) light resistance $\Delta E$: Using Sunshine Weather Meter, color difference of test specimen were measured with color-difference meter (Tokyo Denshoku) before and after 62±2×48 hours weathering test (without rain).
(4) flammability test: Measured according to UL-94.
(5) stickness to metal: The first roll of 6 inches metallic roll is set up at 200° C. and second roll is set up at 60° C. After specimen are pressed lightly to the first roll for 3 minutes and then kneaded for 3 minutes, kneaded resin is removed, and condition of adhesion to the roll is observed.

Evaluation:
level a; not stuck to roll
level b; easily removed from roll
level c; adhered hardly to roll, difficult to remove (6) n=0 and end group composition: Using liquid chromatography (LC) with tetrahydrofuran (THF)/water(H2O)/acetonitrile (ACN) for moving bed, and TSKgelODS-120T (Toso) for column, measured with UV-detector at 280 nm, and shown with average values of ratio of area of each peaks.

Example 1

608 g of tetrabromobisphenol A (hereafter shortened to TBA), 63 g of butylglycidylether whose epoxy equivalent is 135 g/eq. and 220 g of methylisobuthylketone (hereafter shortened to MIBK) are charged into a 3 litre separable flask which is furnished with a thermometer, a stirrer, a dropping funnel and a condenser, heated to dissolve with nitrogen gas purge and add 20 g of 48% NaOH aqueous solution. After reacted for 2 hours at 85–90° C., add 104 g of epichlorohydrine (hereafter shortened to EHC) and react for 3 hours at 85–90° C., then add 100 g of NaOH aqueous solution and react another 4 hours at 85–90° C. After the reaction, the obtained resin solution is diluted by MIBK and salt in the flask is washed by ion exchanged water, neutralized by phospholic acid and washed, then MIBK is removed by evaporation and yellow colored fire retardant A is obtained. The properties of obtained fire retardant are shown in Table 1.

Example 2

408 g of TBA and 30 g of methylglycidylether (Epiol; product of Nihon Yushi Co., Ltd.) whose epoxy equivalent is 95 g/eq. are used and reacted similarly to the Example 1, then 70 g of ECH is added and further reacted. The properties of obtained fire retardant by same procedure to the Example 1 are summarized in Table 1.

Example 3

In a 3 liter separable flask with a thermometer, a stirrer, a dropping funnel and condenser, 165 g of ECH and 26 g of methanol are charged, heated with nitrogen gas purge, the prescribed amount of tin tetrachloride is added and reacted for 10 hours at 60–110° C. 32 g of TBA, 87 g of MIBK and 48% NaOH aqueous solution are added, further reacted for 3 hours at 90, then the prescribed amount of NaOH aqueous solution and 110 g of MIBK are added and epoxydated for 4 hours. After the reaction, the obtained resin solution is diluted by MIBK and salt in the flask is washed by ion exchanged water, neutralized by phospholic acid and washed, then MIBK is removed by evaporation and yellow colored fire retardant A is obtained. The properties of obtained fire retardant are shown in Table 1.

Example 4

52 g of EHC and 18 g of methanol are charged and after reacted similarly to Example 3 except a catalyst is changed to BF3 complex, 734 g of TBA, 260 g of MIBK and 48% NaOH are added, further reacted at 90° C. for 4 hours. Then 127 g of EHC, prescribed amount of NaOH aqueous solution and MIBK, reacted for another 6 hours. Similarly to Example 3, washed, neutralized and the solvent is removed and the fire retardant D is obtained. The properties of obtained fire retardant are shown in Table 1.

Example 5

41.2 g of ECH and 15 g of methanol are used and reacted similarly to the Example 4, then after 408 g of TBA is added and reacted, 91 g of ECH is supplied. By carrying out the similar procedure to Example 4, 486 g of fire retarded oligomer (hereafter shortened to FR-M) whose softening point is 72° C. and containing 47.8% of bromine is obtained. Using 400 g of obtained FR-M, 49 g of TBA and 28 g of TBP into an one liter separable flask with a thermometer, a stirrer, a condenser and nitrogen gas purge line is charged, and 0.19 g of triphenyl phosphine is added and reacted at 140–180° C. Thus the fire retardant E is obtained, and the properties of it are summed up in Table 1.

Comparable Example 1

The features of TB-62 (product of Tohto Chemical, brominated epoxy resin whose both ends are blocked by TBP) are summarized in Table 1.

Comparable Example 2

In an one liter separable flask with a thermometer, a stirrer, a condenser and a nitrogen gas purge line, 800 g of YBD-400 (product of Thoto Chemical, epoxy equivalent is 400 g/eq, bromine contents is 49%) and 200 g of TBA are charged. After 0.12 g of triphenylphosphine is added, reacted at 170–180° C. The properties of obtained fire retardant F are summarized in Table 1.

TABLE 1

|  | Example 1 | Example 2 | Example 3 | Example 4 | Example 5 | Comp. Expl 1 | Comp. Expl 2 |
|---|---|---|---|---|---|---|---|
| fire retardant | A | B | C | D | E | TB-62 | F |
| conts of n = 0 | 23.2 | 19.5 | 13.6 | 14.0 | 31.3 | 41.8 | 22.4 |
| conts of X = Y = A | 23.8 | 22.0 | 11.7 | 25.4 | 23.9 | 0 | 100 |
| conts of X = A, Y = B | 47.5 | 48.5 | 41.3 | 46.4 | 32.6*[1] | 4.2 | 0 |
| conts of X = Y = B | 28.7 | 29.5 | 47.0 | 28.4 | 43.5*[2] | 95.8 | 0 |
| conts of Br % | 48.7 | 50.0 | 49.0 | 50.1 | 50.4 | 57.7 | 51.2 |
| softening temp ° C. | 102 | 110 | 102 | 112 | 100 | 116 | 115 |
| epoxy eq. g/eq. | 1911 | 1830 | 2802 | 1550 | 1469 | 15900 | 805 |

*[1] details of Y = B end groups, methyl group 25.9%, tribromophenyl group 6.7%
*[2] details of X = Y = B end groups, methyl group 34.9%, metyl group and tribromophenyl group 3.6%, tribromophenyl 5.3%

The features of compounds which are mixed in a thermoplastic resin are investigated to know the effect of the obtained fire retardant.

Example 6~10 and Comparative Example 3 and 4

Fire retardant A~E obtained in Example 1~5, and fire retardant TB-62 and F are added to resin in ratios shown in Table 2, mixed by a Henschel mixer then kneaded by a biaxial extruder (Ikegai Tekko, PCM-30) to obtain compounds. Specimen for test are prepared using obtained compounds by a method of injection molding. The features of flammability, adhesive property and light resistance are measured. The obtained results are summarized in Table 2.

TABLE 2

|  | Example 6 | Example 7 | Example 8 | Example 9 | Example 10 | Comp. Expl. 3 | Comp. Expl. 4 |
|---|---|---|---|---|---|---|---|
| mixing ratio parts |  |  |  |  |  |  |  |
| ABS resin | 69 | 70 | 70 | 70 | 70 | 73 | 70 |
| fire retardant | A | B | C | D | E | TB-62 | F |
|  | 26 | 25 | 25 | 25 | 25 | 22 | 25 |
| $Sb_2O_3$ | 5 | 5 | 5 | 5 | 5 | 5 | 5 |
| flammability UL-94 | V-0 | V-0 | V-0 | V-0 | V-0 | V-0 | V-0 |
| light resist ΔE | 8.3 | 8.6 | 9.7 | 8.4 | 9.1 | 14.9 | 7.6 |
| non stickness | a | a | a | a | b | a | c |

The fire retardant of this invention is the compound of halogenated epoxy resin whose epoxy groups are partially blocked with monoalcohol of carbon number 1 to 8 or tribromophenol. Said fire retardant can be provided as the fire retardant for a thermoplastic resin by being used together with a subsidized fire retardant such as antimony oxide, a fiber reinforce material and an inorganic filler. And, in a case of the fire retarded styrene resin which uses the fire retardant of this invention, the excellent light resistance and good removing property from the metallic part of an extruder or an injection molding machine. Further, in cases of fire retarded resin composition e.g. polyester, polycarbonate, polyamide and polymer alloy of them, an excellent hydrolysis resistance can be expected, effectively can prevent the gelation, high liquidity can be expected and also it is effective to improve a productivity of molding process.

What is claimed:

1. A halogen containing fire retardant represented by chemical formula (1), $$X-O-\underset{Br}{\overset{Br}{\bigcirc}}-\underset{CH_3}{\overset{CH_3}{C}}-\underset{Br}{\overset{Br}{\bigcirc}}-O-CH_2-\underset{OH}{CH} \quad (1)$$

-continued $$-CH_2-O-\underset{Br}{\overset{Br}{\bigcirc}}-\underset{CH_3}{\overset{CH_3}{C}}-\underset{Br}{\overset{Br}{\bigcirc}}-O-Y$$ $_n$ wherein the end groups X and Y are composed by A or B represented by chemical formula (2); and the said fire retardant comprises a mixture of the composition containing 1 to 40% of X=Y=A, the composition containing 30 to 70% of X=A and Y=B, the composition containing smaller than 70% of X=Y=B and, degree of polymerization n is n≧0 wherein the content of n=0 is smaller than 60% to the total amount;

wherein A and B are represented by following chemical formulae, and R of chemical formula B is an alkyl group of carbon number 1 to 8 alone, or 1 to 79% of alkyl group of carbon number 1 to 8 and 79 to 1% of tribromophenyl group, and total amount of R is smaller than 80%

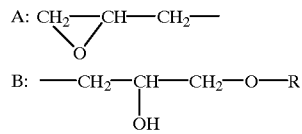

(2)

2. The halogen containing fire retardant of claim 1 wherein the epoxy equivalent is from 1000 to 5000 g/eq.

3. A fire retarded thermoplastic resin compound containing the halogen containing fire retardant of claim 1.

4. A fire retarded thermoplastic resin compound containing the halogen containing fire retardant of claim 2.

* * * * *